United States Patent [19]
Kuratomi

[11] 3,792,623

[45] Feb. 19, 1974

[54] ROLLER CHAINS AND THE METHOD OF MANUFACTURING THE SAME

[76] Inventor: Tatsuo Kuratomi, 2-18, 4-Chome, Hamatake, Kanagawa Prefecture, Chigasaki, Japan

[22] Filed: May 2, 1972

[21] Appl. No.: 249,657

[30] Foreign Application Priority Data
May 12, 1971 Japan.......................... 46-31184
May 12, 1971 Japan.......................... 46-31185

[52] U.S. Cl............................................. 74/250 R
[51] Int. Cl............................................. F16h 13/02
[58] Field of Search...................... 74/250 R, 255 R

[56] References Cited
UNITED STATES PATENTS
3,359,815   12/1967   Jeffrey et al..................... 74/250 R Primary Examiner—Leonard H. Gerin
Attorney, Agent, or Firm—Otto John Munz

[57] ABSTRACT

Improvements in and relating to roller chains and method of manufacturing the same, wherein axial dimension of the pin insertion holes or bush insertion holes is increased compared to the case of a planar link plate to increase the contact area between link plate and pin or bush, thereby preventing the elongation of the chain due to abnormal deformation resulting in the contact portions.

3 Claims, 8 Drawing Figures

PATENTED FEB 19 1974　　3,792,623

3,792,623

ROLLER CHAINS AND THE METHOD OF MANUFACTURING THE SAME

This invention relates to improvement in and relating to roller chains and method of manufacturing the same.

The roller chain consists of pin link plates, roller link plates, pins bushes and rollers. However, they are prone to elongation in course of service in power transmission. This dictates the necessity of adjusting the distance between a chain drive sprocket and a driven sprocket so that the chain is always held under appropriate tension. The elongation of the kind referred to above stems from abnormal deformation of the pin insertion holes in pin link plates and bush insertion holes in roller link plates, that results in a long service time. The pin link plates and roller link plates are usually made from a thin steel plate of such sectional area as is just sufficient to withstand the load exerted to the chain. Accordingly, the contact area between the pin and pin link plate or between the bush and roller link plate is very small. Therefore, during operation the afore-mentioned contact portions are subject to extremely high load due to the tension in the chain. Besides, if the tension changes the load on the contact portions is abnormally increased, resulting in similar effects that might result when the contact portion is rapped. Thus, the holes are expanded, and they undergo abnormal deformation to cause elongation of the chain.

To prevent such elongation of the chain it is necessary to reduce local concentration of the load due to the tension in the chain by increasing the contact area between the pin link plate and pin pressure fitted therein or between the roller link plate and bush pressure fitted therein. To this end, it has been proposed to provide a boss surrounding the pin insertion hole for increasing the contact area.

The principal object of the invention is to provide a roller chain which is less prone to elongation. According to the invention, instead of providing a boss surrounding a pin insertion hole in the link plate, an alongate raised portion is provided to the link portion longitudinally along the center thereof over the entire length thereof, and pin insertion holes or bush insertion holes are formed through this raised portion, so that a rectangular or substantially rectangular cross sectional contour similar to that which would be obtained with a boss may be obtained. In this manner, the contact area between the pin and the constact portion surrounding the pin or the constact area between the bush and the conatat portion surrounding the bush can be increased for reducing the local load concentration. In another aspect, the thickness of the portions of the link plate on opposite edges of the raised portion is reduced, so that the weight and mechanical strength of the link plate itself can be substantially the same as those of the usual flat link plate without any raised portion. The provision of such raised portion may be made out only to the pin link plate but also to the roller link plate. In other words, in the constraction of the roller chain, either the pin link plate alone may be formed with raised portion or both pin link plate and roller link plate may be formed with raised portion.

Another object of the invention is to provide a method of manufacturing roller chains, in which the link plate with raised portion is produced by stamping the eventual link plate from a steel plate formed by rolling with many parallel elongate raised portions of the same dimensions and at a constat pitch, the dimentions being the same as those of the raised portion of the link plate. Thus, it is made possible to produce roller chains less prone to elongation without increasing the production cost.

To manufacture a roller chain by the method according to the invention, a steel plate is formed through rolling such that it has many parallel elongate raised portions spaced a constant interval and having the same dimensions as the raised portion of the link plate to be produced. To this end, the cylindrical working rolls of the rolling mill is cut with many grooves of the complementary shape to the above raised portions. Then, eventual link plates are stamped from the steel plate thus formed such that each of the raised portion of the steel plates just extends through the longitudinal center of the respective eventual link plates. Then, the pin link plate is completed by forming the eventual link plate with pin insertion holes penetrating the raised portion near opposite ends thereof. The roller link plate may also be formed by similarly forming bush insertion holes. The diametrical dimension of the pin insertion hole or bush insertion hole is selected to be smaller than the transversal dimension or width of the raised portion. Finally, the pin link plate having a raised portion are alternately tied to roller link plates either having a raised portion or being flat without any raised portion to complete a roller chain.

The above and other objects, features and advantages of the invention will become more apparent from the following description when read in conjunction with the accompanying drawing, in which.

Figure 1:
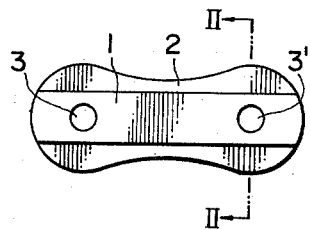
FIG. 1 is a plan view of a link plate having a ridge portion.

FIG. 1 shows, in plan view, a link plate having a raised or thicker portion for use in assembling a roller chain according to the invention. Numeral 1 designates the raised portion which extends longitudinally long the center of the link plate over the entire length thereof. Numeral 2 designates thinner portions on opposite edges of the riased portion 1. Numerals 3 and 3' designate holes penetrating the raised portion near the opposite ends thereof for pressure insertion of respective pins. The diametrical dimension of the hole is smaller than the width of the raised portion.

Figure 2:
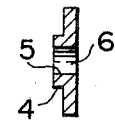
FIG. 2 is a section taken along line II—II in FIG. 1.

FIG. 2 is a section taken along line II—II in FIG. 1. Numeral 4 shows the cross sectional profile of part of the raised portion formed with a hole 6 insertion of a pin or bush. It is clearly shown that the diameter of the hole 6 is smaller than the width of the raised portion. Since the hole for insertion of a pin or bush penetrates the raised portion, the area of contact between the pin or bush and the link plate can be extremely increased compared to the case of contact between a flat link plate without any raised portion and the pin or bush.

Figure 3:
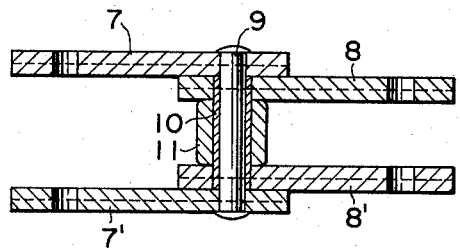
FIG. 3 is a sectional view showing part of a roller chain using pin link plates and roller link plates both having a ridge portion.

FIG. 3 shows part of a roller chain constructed by using pin link plates 7 and 7' roller link plates 8 and 8', both having a raised portion, a pin 9, a bush 10 and a roller 11.

Figure 4:
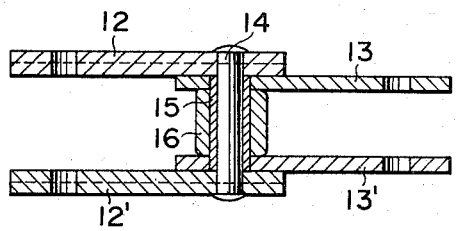
FIG. 4 is a sectional view showing part of a roller chain using planar or flat pin link plates.

FIG. 4 shows part of a roller chain constructed by using pin link plates 12 and 12' having a raised portion, roller link plates 13 and 13' which are planar or flat, a pin 14, a bush 15 and a roller 16.

A method of manufacturing roller chains according to the invention will now be described.

Figure 5:
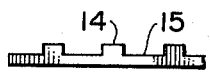
FIG. 5 is a sectional view showing a steel plate for stamping link plates in the method according to the invention.

FIG. 5 shows a section of a steel plate for stamping link plates with a raised portion according to the invention. It is formed by rolling, and its upper side is formed with appropriately spaced parallel elongate raised portions of the same thickness as that of each link plate. To manufacture such steel plate by rolling, a cut with grooves of the same dimensions and same spacing as the raised portions of the steel plate is used.

In the Figure, numeral 14 designates the raised portions formed on the steel plate by the rolling operation, and numeral 15 designates grooves or thick portions similarly formed between adjacent raised portions.

Figure 6:
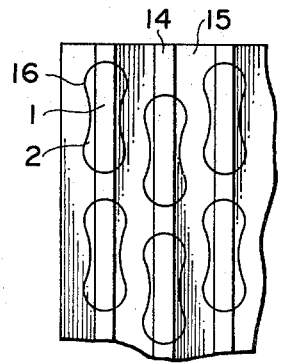
FIG. 6 is a fragmentary plan view of the same steel plate with a layout for stampling the link plates.

FIG. 6 shows a layout for stamping link plates from the steel plates formed with many alternate parallel ridges and grooves, which are so formed by rolling. Numeral 14 designates the raised portion, numeral 15 the groove portion, and numeral 16 the shape of stamping blade. As is seen, the stamping die is positioned such that the raised portion 1 extends longitudinally along the center of the link plate over the entire length thereof. The thinner portions on opposite sides of the thicker raised portion of the link plate are thus constituted by the groove portion of the steel plate. The portion thus laid out is stamped from the steel plate to produce. The link plate produced in this manner has a shape as shown in FIG. 1. The difference between the pin link plate and roller link plate produced in the above manner is only in that the pin insertion holes formed through the raised portion of the former nead the opposite ends thereof is slightly smaller in diameter than the bush insertion holes formed in the latter.

Figure 7:
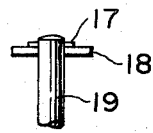
FIG. 7 is a fragmentary sectional view showing a pin pressure fitted in a pin link plate having a ridge portion.
Figure 8:
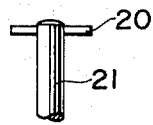
FIG. 8 is a fragmentary sectional view showing a pin pressure fitted in a pin link plate without any raised or thicker portion.

FIGS. 7 and 8 show a pin link plate with raised portion fitted with a pin and a flat pin link plate without raised portion also fitted with a pin.

In FIG. 7, reference numeral 17 designates raised portion, numeral 18 thinner portions on opposite edges thereof, and numeral 19 a pin pressure inserted through the thick raised portion 17.

In FIG. 8, numeral 20 designates the planar or flat link plate without any raised portion, and numeral 21 a pin pressure fitted in the central hole in the plate.

From the comparison of both plates, it will be apparent that the contact area between the pin link plate and pin is large in case of the pin link plate having the raised portion the flat to theflat one. Absolutely the same thing applies to the roller link plates. More particularly, the contact area between the roller link plate and the bush fitted therein is large in case of the roller link plate having the raised portion compared to the flat one.

As has been described, in the manufacture of roller chains according to the invention by forming bush insertion holes or pin insertion holes through a raised portion longitudinally extending along the center of the link plate over the entire length thereof, the contact area between pin link plate and pin or between roller link plate and bush may be increased, which is very effective in preventing the alongation of the chain due to the abnormal deformation that is likely to result in the contact portions.

What is claimed is:

1. A roller chain consisting of pin link plates, roller link plates and pins tying two link plates in pair, each of said pin link plates having an outwardly raised portion of a rectangular or nearly rectangular cross sectional profile, said raised portion extending longitudinally along the center of said each pin link plate over the entire length thereof, said each pin link plate being formed with pin insertion holes penetrating said raised portion near opposite ends thereof.

2. The roller chain according to claim 1, wherein said roller link plates have the same configuration as said pin link plates except for the size of the pin insertion holes.

3. The roller chain according to claim 1, wherein said roller link plates are flat without any raised portion.

* * * * *